(12) United States Patent
Dechesne et al.

(10) Patent No.: US 11,060,899 B2
(45) Date of Patent: Jul. 13, 2021

(54) METHOD FOR DETERMINING A MAXIMUM ALLOWABLE VOLUME OF WATER THAT CAN BE REMOVED OVER TIME FROM AN UNDERGROUND WATER SOURCE

(71) Applicant: VEOLIA ENVIRONNEMENT-VE, Paris (FR)

(72) Inventors: Magali Dechesne, Saint Maur des Fosses (FR); Sébastien Kech, Le Pecq (FR); Pierre Mandel, Paris (FR); Vincent Martin, Paris (FR)

(73) Assignee: VEOLIA ENVIRONNEMENT VE, Paris (FR)

( * ) Notice: Subject to any disclaimer, the term of this patent is extended or adjusted under 35 U.S.C. 154(b) by 318 days.

(21) Appl. No.: 16/318,704

(22) PCT Filed: Jul. 27, 2017

(86) PCT No.: PCT/FR2017/052124
§ 371 (c)(1),
(2) Date: Jan. 17, 2019

(87) PCT Pub. No.: WO2018/020181
PCT Pub. Date: Feb. 1, 2018

(65) Prior Publication Data
US 2019/0277686 A1   Sep. 12, 2019

(30) Foreign Application Priority Data

Jul. 29, 2016  (FR) ........................................ 1657370
Dec. 20, 2016  (FR) ........................................ 1662916

(51) Int. Cl.
*G01F 22/00* (2006.01)
*E03B 3/06* (2006.01)
(Continued)

(52) U.S. Cl.
CPC ................ *G01F 22/00* (2013.01); *E03B 1/00* (2013.01); *E03B 1/02* (2013.01); *E03B 3/06* (2013.01);
(Continued)

(58) Field of Classification Search
CPC ... G01F 22/00; E03B 1/02; E03B 1/00; E03B 3/06; G06F 3/05; G06Q 50/06; E21B 43/00; G05B 19/042; G05B 2219/2625
See application file for complete search history.

(56) References Cited

U.S. PATENT DOCUMENTS 8,849,639 B2 *  9/2014  Brown .................... E21B 49/00
                                                   703/10
9,202,252 B1 * 12/2015  Smith .................... G06Q 50/06
(Continued)

FOREIGN PATENT DOCUMENTS

CN       103810648 A      5/2014
KR     20150081527 A      7/2015
(Continued)

OTHER PUBLICATIONS

Malefane. Groundwater resource assessment for town water supply in steynsrus in the Free State province of South Africa (Year: 2016).*
(Continued)

*Primary Examiner* — Mohammad K Islam

(57) ABSTRACT

The invention relates to a method for determining a maximum allowable volume of water that can be removed over time from an underground water source, the volume of water being removed at a removal point and the hydrogeological state of the underground water source being qualified by piezometric measurements on a reference piezometer, the method being characterized in that it includes, in particular, a continuous measurement by a first piezometric level sensor (Continued)

on the removal point, the sensor having a first log of available data over a predetermined period that has passed; and another continuous measurement by a second piezometric level sensor on the reference piezometer, the second sensor having a second log of available data over the predetermined period that has passed; the method also comprising subsequent steps implemented by a calculation machine.

4 Claims, 1 Drawing Sheet

(51) Int. Cl.

| | | |
|---|---|---|
| *G05B 19/042* | (2006.01) | |
| *G06F 3/05* | (2006.01) | |
| *E03B 1/00* | (2006.01) | |
| *G06Q 50/06* | (2012.01) | |
| *E21B 43/00* | (2006.01) | |
| *E03B 1/02* | (2006.01) | |

(52) U.S. Cl.
CPC ............ *E21B 43/00* (2013.01); *G05B 19/042* (2013.01); *G06F 3/05* (2013.01); *G06Q 50/06* (2013.01); *G05B 2219/2625* (2013.01)

(56) References Cited

U.S. PATENT DOCUMENTS

| | | | | |
|---|---|---|---|---|
| 10,030,502 | B1* | 7/2018 | Singer | G01F 23/0076 |
| 10,215,883 | B2* | 2/2019 | McKenna | E21B 47/00 |
| 10,809,175 | B1* | 10/2020 | Ayadat | G01N 15/0806 |
| 2009/0241685 | A1* | 10/2009 | Charette | G01F 1/7086 |
| | | | | 73/861.07 |
| 2010/0193183 | A1 | 8/2010 | Lambie et al. | |
| 2012/0101934 | A1* | 4/2012 | Lindores | G06Q 30/08 |
| | | | | 705/37 |
| 2013/0160357 | A1* | 6/2013 | Luciano, Jr. | A01G 13/065 |
| | | | | 47/2 |
| 2014/0180596 | A1* | 6/2014 | Frey | A01G 22/00 |
| | | | | 702/19 |
| 2016/0157446 | A1* | 6/2016 | Bentwich | A01G 25/167 |
| | | | | 700/284 |
| 2016/0309659 | A1* | 10/2016 | Guy | A01G 7/00 |
| 2017/0270624 | A1* | 9/2017 | Rooney | G06Q 20/14 |
| 2018/0129175 | A1* | 5/2018 | Jennings | A01G 25/16 |
| 2019/0008103 | A1* | 1/2019 | Goldberg | B25J 11/00 |
| 2021/0010993 | A1* | 1/2021 | Shibata | G06N 20/00 |

FOREIGN PATENT DOCUMENTS

| | | |
|---|---|---|
| WO | 2018020180 A1 | 2/2018 |
| WO | 2018020181 A1 | 2/2018 |

OTHER PUBLICATIONS

Foreign Communication from a Related Counterpart Application, International Search Report dated Sep. 15, 2017, International Application No. PCT/FR2017/052123 filed on Jul. 27, 2017.
Foreign Communication from a Related Counterpart Application, International Search Report dated Sep. 14, 2017, International Application No. PCT/FR2017/052124 filed on Jul. 27, 2017.
Foreign Communication from a Related Counterpart Application, Written Opinion dated Sep. 15, 2017, International Application No. PCT/FR2017/052123 filed on Jul. 27, 2017.
Foreign Communication from a Related Counterpart Application, Written Opinion dated Sep. 14, 2017, International Application No. PCT/FR2017/052124 filed on Jul. 27, 2017.
Dechesne, Magali, et al., "Tool for Managing Multiple Water Resources," filed Jan. 24, 2019, U.S. Appl. No. 16/320,479.

* cited by examiner

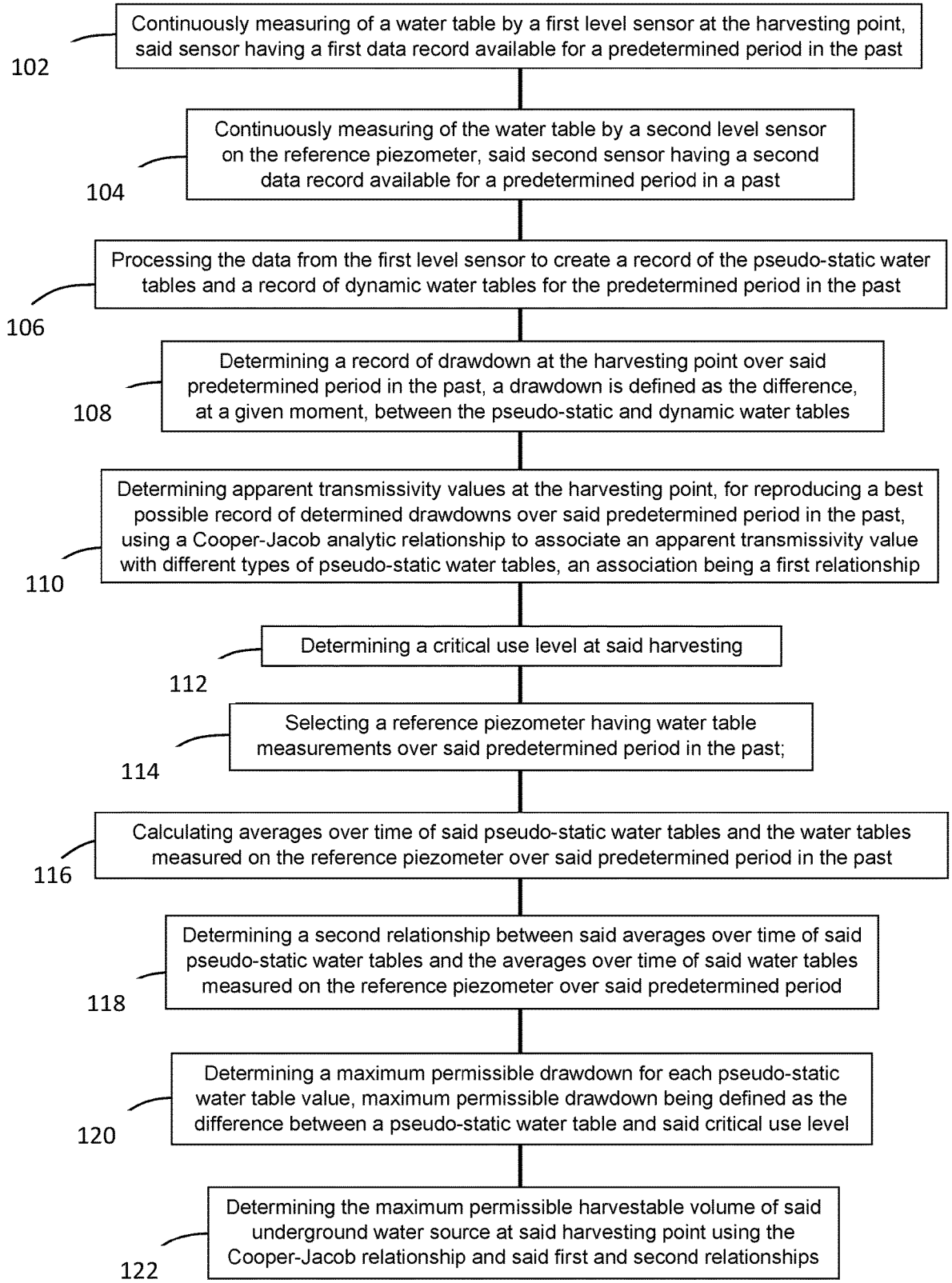

METHOD FOR DETERMINING A MAXIMUM ALLOWABLE VOLUME OF WATER THAT CAN BE REMOVED OVER TIME FROM AN UNDERGROUND WATER SOURCE

CROSS-REFERENCE TO RELATED APPLICATIONS

The present application is a filing under 35 U.S.C. 371 as the National Stage of International Application No. PCT/FR2017/052124, filed Jul. 27, 2017, entitled "METHOD FOR DETERMINING A MAXIMUM ALLOWABLE VOLUME OF WATER THAT CAN BE REMOVED OVER TIME FROM UNDERGROUND WATER SOURCE," which claims priority to French Application No. FR 1657370 filed with the Intellectual Property Office of France on Jul. 29, 2016, both of which are incorporated herein by reference in their entirety for all purposes.

The invention relates to a method for determining over time a maximum permissible volume of water that can be harvested from a groundwater source, said volume of water being harvested at a harvesting point and the hydrogeological status of the groundwater source is qualified by measurements of water tables on a reference piezometer.

TECHNICAL FIELD

Today, laws limiting water use reflect recurring tensions on groundwater resources, especially on aquifers, in dry periods. These tensions are exacerbated by seasonal water needs for agricultural irrigation or the impact of tourist inflow on the drinking water supply. For a system of water production, these tensions may incur additional operating costs related to purchasing of water, pumping costs or processing costs. The context of climate change could amplify these tensions in the medium-term.

The volume of water harvestable from an underground water resource is often difficult to estimate because of the complexity of water systems, the groundwater resource may for example be a layer within an aquifer.

PRIOR ART

Many methods exist for determining a harvestable volume over a whole groundwater resource. But the difficulty is to assess the actual volume of available water on a harvesting structure for the groundwater source, i.e. at a water production system consisting of a groundwater catchment (harvesting point) or a set of catchments (harvesting points) forming a wellfield. This estimated harvestable volume depends on the characteristics of the catchment itself and local hydrodynamic characteristics of the underground water source.

Estimating a volume harvestable over a whole water production system mobilizing one or more groundwater catchments depends both on the volume of harvestable water in the groundwater resource and the configuration of the catchments themselves. In theory, only a 2D or 3D spatial model would make it possible to perform such simulations and to simulate a series of prospective piezometric data at a given point of the groundwater source. This type of tool is complex to implement, but there are also simplified graphic, statistical and/or analytical processes to estimate a harvestable volume for a given borehole.

The methods currently used distinguish several terms to define the boundaries of a resource or a production system: hydrogeological limit, potential limit, limit of the resource/system, and "Deployable Output".

It should be noted that the "Deployable Output" is the volume of raw water that can be distributed after treatment, from one or more resources, taking into account, for a specific water demand:
  hydrogeological limits,
  the physical and operational constraints (due to physical capacity pumping infrastructure, transport and treatment, hydraulic constraints in terms of water depth requirements or minimum/maximum pressure),
  the water quality constraints (periods associated with a deterioration in water quality, or target level so as not to dewater aquifers, etc.),
  regulatory constraints (harvesting authorizations).

It should also be noted that each of these parameters can be a limiting factor for the "Deployable Output". Once the "Deployable Output" has been determined, the water losses and exports are subtracted and imports added to obtain the volumes available for distribution. However, this approach is unsatisfactory because it only provides a single value and a very conservative maximum harvestable volume.

Other methods are based on an estimate of the long-term use limit for a borehole. For example, for a confined aquifer, analytical methods make it possible to calculate a theoretical limit of safe use. This limit is generally the rate that can be maintained for a long period, without going beyond the available drawdown. Note that the available drawdown is the difference between the water level in the absence of pumping and the high water table of the confined aquifer. This limit is considered to be an indicator rather than a reliable limit.

However, the methods currently used and dedicated to the estimation of the maximum volume harvestable for underground water harvesting points over the long term provide very safe estimates because catchments are generally not used continuously and aquifers are replenished in parallel. The use of these processes over such long periods of time, for example twenty years, is unrealistic, because the conditions of use over such periods are no longer met. Moreover, these processes assume a consistent flow of harvesting throughout this long-term period, which is unrealistic. In other words, the methods currently used do not meet the desired objectives, as they provide a single value maximum harvestable volume that is not updated according to the hydrogeological situation.

There is therefore a real need to provide a method which overcomes the shortcomings, disadvantages and obstacles of the prior art. In particular, there is a need to provide a process for responding to all expectations, including:
  assessing a realistic volume of harvestable groundwater and not just a safe volume;
  evaluating a volume of harvestable groundwater variable in time according to the various constraints;
  a simple approach, applicable to a large number of catchments.

DESCRIPTION OF THE INVENTION

To solve one or more of the aforementioned drawbacks, the invention relates to a method for determining over time a maximum permissible volume of water that can be harvested from a groundwater source, said volume of water being harvested at a harvesting point and the hydrogeological status of the groundwater source is qualified by measurements of water tables on a reference piezometer, said method being characterized in that it comprises the following steps:

a) continuously measuring of the water table by a first level sensor at the harvesting point, said sensor having a first data record available for a predetermined period in the past;
   b) continuously measuring of the water table by a second level sensor on the reference piezometer, said second sensor having a second data record available for a predetermined period in the past;

said method further comprising the following steps implemented by a computer:

c) processing the data from the first level sensor to create a record of the pseudo-static water tables and a record of dynamic water tables for the predetermined period in the past;
   d) determining a record of drawdown at the harvesting point over said predetermined period in the past, a drawdown is defined as the difference, at a given moment, between the pseudo-static and dynamic water tables;
   e) determining apparent transmissivity values at the harvesting point, for reproducing the best possible record of determined drawdowns over said predetermined period in the past, using the Cooper-Jacob analytic relationship to associate an apparent transmissivity value with different types of pseudo-static water tables, the association being a first relationship;
   f) determining a critical use level at said harvesting point;
   g) selecting a reference piezometer having water table measurements over said predetermined period in the past;
   h) calculating averages over time of said pseudo-static water tables and the water tables measured on the reference piezometer over said predetermined period in the past;
   i) determining a second relationship between said averages over time of said pseudo-static water tables and the averages over time of said water tables measured on the reference piezometer over said predetermined period;
   j) determining a maximum permissible drawdown for each pseudo-static water table value, maximum permissible drawdown being defined as the difference between a pseudo-static water table and said critical use level;
   k) determining the maximum permissible harvestable volume of said underground water source at said harvesting point using the Cooper-Jacob relationship and said first and second relationships.

The water resource can be an underground raw water resource, such as springs, aquifers, karsts, tapped via one or more catchments. Preferably, the water resource is an aquifer whose volume of harvestable water is determined by the water table. It should be noted that water resources can be connected to one or more water production entities such as treatment plants.

In the present invention, critical use level is understood to mean the level below which the extraction of water affects proper regeneration of the resource's water and/or affects the raw material thereby obtained.

Advantageously, the averages over time are monthly averages.

The invention also relates to a computer program comprising instructions adapted to the implementation of each step of the above described method when said program is executed on a computer.

The invention also relates to a system comprising means adapted to implement each of the steps of the method described above.

The invention will be better understood from reading the following description given only as an example and provided for informational purposes only and which is in no way restrictive.

DESCRIPTION OF THE FIGURE

FIG. 1 illustrates a flow chart of a method for determining over time a maximum permissible volume of water that can be harvested from a groundwater source.

DETAILED DESCRIPTION

According to an embodiment of the invention, a method for determining over time a maximum permissible volume of harvestable water is applied to an aquifer. The volume of water is then harvested at a harvesting point which may for example be equipped with any extraction device that is used and known from the prior art. The hydrogeological condition of the aquifer is then qualified by measurements of the water tables on a reference piezometer.

Since the water resource is an aquifer, the volume of harvestable water it contains is therefore determined by the water table. In this configuration, the method for determining the water table makes it possible to indirectly take into account the hydrogeological situation of the aquifer, as well as the natural and human phenomena impacting the quantitative status of the aquifer. This method is simple, robust and applicable to continuous aquifers, i.e. non-karst and non-fractured aquifers, and for multiple extraction device configurations such as boreholes, collector wells, wellfields, e.g. with the exception of spring water catchments.

It should be noted that the quantitative management of water contained in the aquifer and the definition of volumes harvestable from said aquifer require the prior definition of spatial boundaries of the area in question. These limits are defined on the basis of local geological and hydrogeological characteristics.

For example, geological and hydrogeological data for regional water tables, transmissivity and even the storage coefficient, and usage data (e.g. water level measurements and the reference water table used, the volumes harvested, nominal flow rates of one or more pumps) are generally available.

The definition of harvestable volumes of groundwater from the aquifer also requires having a good knowledge of its hydrogeological status, a record of all inputs to and outputs from the water system (natural or manmade), and evaluating its intrinsic storage capacity.

For example, general characteristics are available regarding the water extraction, geological sections, which are schematic representations of the succession of geological formations on a vertical profile, indicating the associated water tables, or technical sections that are schematic representations of the features and dimensions of the equipment of an underground structure, for example, on a vertical profile. Examples can be cited such as, bare holes, the characteristics of pre-casing and casing, filtering gravel, cementation, and head protection.

The quantitative management of an aquifer thus requires knowledge of its status, its replenishment, harvesting done on it and the needs.

Other use data such as the number of daily hours of pumping and the average daily instantaneous flow rate can optionally also be considered.

The method of the invention as shown in FIG. 1 comprises a step 102 *a*) consisting of using a first sensor to continuously measure the water table at the harvesting point, said sensor having a first data record available for a predetermined period in the past. It is necessary to have water table values for the aquifer extending over a predetermined period, which may for example be at least two years. Said first sensor may function with other sensors in order to make it possible to subsequently provide pseudo-static water tables, defining the state of the aquifer without the influence of the harvesting at the harvesting point, as well as dynamic water tables defining the state of the aquifer in the pumping phase at the harvesting point. These water tables are input values necessary for implementation of the method according to the invention.

The method also comprises a step 104 *b*), carried out after step 102 *a*), consisting in continuously measuring of the water table by a second level sensor on the reference piezometer, said second sensor having a second data record available for a predetermined period in the past. This step makes it possible to later select the appropriate reference piezometer associated with the aquifer from which the volume of water is harvested. In other words, this step makes it possible to link the behaviour of the aquifer at the harvesting point with the behaviour of the aquifer at the reference piezometer. This connection is possible, as discussed later in this description, by comparing the averages over time of the pseudo-static water tables at the harvesting point and the averages over time of the water tables at the reference piezometers over the same predetermined period in the past.

After step 104 *b*), the method comprises a step 106 *c*) implemented by a computer of processing the data from the first level sensor to create a record of the pseudo-static water tables and a record of dynamic water tables for the predetermined period in the past.

For this, the daily use data regarding extraction can be recovered over a period of two years. This use data can, for example, provide information about:
- the pseudo-static water table (maximum daily depth value, in m) of the studied aquifer;
- the dynamic water table (minimum daily value, in m);
- the daily pumping time (in hours);
- daily average flow at a given time (m³/h);
- the daily harvested volume (m³/d).

Thereafter, a step 108 *d*) is carried out and consists in determining a record of drawdown at the harvesting point over said predetermined period in the past, a drawdown is defined as the difference, at a given moment, between the pseudo-static and dynamic water tables.

After step 108 *d*), a step 110 *e*) is applied and consists of determining apparent transmissivity values at the harvesting point, for reproducing the best possible record of determined drawdowns over said predetermined period in the past, using the Cooper-Jacob analytic relationship to associate an apparent transmissivity value with different types of pseudo-static water tables, the association being a first relationship.

This first relationship can be determined by the following Cooper-Jacob analytical relationship:

$$s(r, t) = \frac{2.303 Q}{4\pi T} \log\left(\frac{2.25 T t}{r^2 S}\right)$$

This relationship is commonly used in quantitative hydrogeology. It makes it possible to provide an estimate of the maximum volume of groundwater harvestable as a function of the drawdown, the latter being dependent on the static water table of the aquifer.

In particular, the relationship of Cooper-Jacob is used to calculate a theoretical drawdown s (r, t), setting the parameters necessary to make it possible to apply this relationship, that is to say the transmissivity (T), the storage coefficient (S), the radial distance at the harvesting point (r), the duration of daily harvesting (t), and the average daily flow rate at a given moment (Q).

The pairs of drawdown/pseudo-static daily water table points can then be plotted on a chart for values close to the average daily flow. The chart makes it possible to visually segment the drawdown values observed in several types of pseudo-static daily water tables. For each type, the apparent transmissivity values can be adjusted so that the value of the deviation indication (commonly referred to as RMSE) between simulated and observed drawdown with the Cooper-Jacob relationship is at a minimum.

In a next step 112 *f*), determining a critical use level at said harvesting point. It should be noted that the critical use level for a catchment such as a well or a borehole may be impacted by:
- the upper altimetric water table of the screened portion of the casing;
- the local use limit of the water table of the aquifer, which can be:
  - a water table for maintaining the status of the aquifer,
  - a water table for non-intrusion into the saltwater wedge,
  - a water table for non-dewatering of a productive area,
  - a regulatory water table (target water table, alert threshold . . . )
- the water table of the suction strainer of the pump or the safety water table that triggers the pump to turn off.

The highest water table, therefore the worst, will be retained as a critical operating level for the structure, noted as $z_{NC}$. Determining the critical level therefore requires having the technical section and the geological section of the structure, and the possible existence of regulatory water tables for aquifer management. It should be noted that in the case of a wellfield, the least favourable critical level will be selected and applied to the conceptual catchment which will represent the wellfield as a single harvesting point. It should be noted that the critical use level can be set in advance and may represent an alert threshold.

Next, the following step is step 114 *g*) of selecting the reference piezometer. It should be noted that the selection of the reference piezometers, which is typically a regional reference piezometer requires listing all piezometers collecting the groundwater body being studied. These piezometers can be identified easily by consulting databases, and searching for water level monitoring stations per water body. Of these piezometers, only those who are active and who have a sufficient history for predetermined time in the past (ideally more than 10 years) will be considered. This history is known from the measurements acquired by the second sensor.

Then, in a step 116 h), averages are calculated over time of said pseudo-static water tables and the water tables measured on the reference piezometer over said predetermined period in the past.

Preferably, the averages over time are monthly averages. The reference piezometer is retained as follows: minimizing the RMSE between monthly average of the pseudo-static water table at the catchment and the translation of the monthly average of the static water table measured at the piezometer on the common period of observation.

This translation (denoted $h_{s_{pt}}$) is obtained by adding to each value of the static monthly history ($h_{s_p}$) of the piezometer, the relative difference between the average of the pseudo-static monthly water tables at the catchment $\overline{h_{s_c}}$ and the average monthly static water tables at the piezometer $\overline{h_{s_p}}$ as shown below:

$$h_{s_{pt}}(t) = h_{s_p}(t) + (\overline{h_{s_c}} - \overline{h_{s_p}})$$

In the event there are several piezometers with a similar RMSE, the one with the longest history will ideally be retained.

Then, in a further step 118 i), determining a second relationship between said averages over time of said pseudo-static water tables and said water tables measured on the reference piezometer over said predetermined period in the past. This step, then, in the case of future scenarios on the hydrogeological status of the aquifer, makes it possible to determine an average over time of the pseudo-static water table at the catchment from an average over time of the water table at the reference piezometer using said second relationship.

The second relationship, usually linear, or consisting of a plurality of linear segments, will be retained and will express the theoretical average monthly pseudo-static water table at the catchment as a function of the average monthly water table at the reference piezometer. This empirical relationship can be achieved by using one or more linear regressions on a scatter-plot chart, or by using other correlation functions.

Thereafter, a step 120 j) is carried out and consists of determining a maximum permissible drawdown for each pseudo-static water table value, maximum permissible drawdown being defined as the difference between a pseudo-static water table and said critical use level. It should be noted that the maximum permissible drawdown is considered to be the difference between the pseudo-static water table and the critical use level, i.e. the alert threshold. A higher maximum permissible drawdown will allow a greater harvestable volume. The maximum permissible drawdown, $s_{max}$, variable over time t is defined as the difference between the pseudo-static water table $h_{ps}$ and the critical use level, denoted $z_{nc}$.

$$s_{max}(t) = h_{ps}(t) - z_{nc}$$

The maximum permissible drawdown indirectly reflects harvesting and the natural replenishment and discharge phenomena of the aquifer. These influence the pseudo-static water table.

Then finally, a step 122 k) is carried out and consists in determining the maximum permissible harvestable volume of said underground water source at said harvesting point using the Cooper-Jacob relationship and said first and second relationships.

The maximum harvestable volume $V_{max}$ is calculated at each time moment of the simulation, using the Cooper-Jacob (1946) relationship and the $T=f(h_{ps})$ relation obtained in the previous step. It depends on the maximum permissible drawdown $s_{max}$:

$$V_{max} = Q_{max} \cdot t_{exp} = \frac{4\pi T(h_{ps}) s_{max}}{2,303} \frac{t_{exp}}{\log\left(\frac{2.25 T(h_{ps}) t_{exp}}{r^2 S}\right)}$$

$t_{exp}$ being the maximum use life.

In the calculation of the maximum harvestable volume, the $t_{exp}$ value is set by default at 20 hours/day. In the case of a wellfield, the maximum harvestable volume is the volume harvestable by all catchments in said wellfield.

Thus, this process indirectly takes into account the hydrogeological situation, the replenishing/discharge effects of the aquifer and natural phenomena that influence pseudo-static water tables measured at the catchment. It also indirectly takes into account the effects of overall harvesting on the aquifer and human activities that influence the pseudo-static dimensions water tables measured at the catchment.

Thus, according to this preferred method of the invention, it is possible to forecast future availability of water resources, especially the aquifer, on the basis of:
the water trends obtained daily,
integration of climate change as a variable in medium- and long-term scenarios.

The quantitative monitoring of groundwater is verified, according to the preferred embodiment of the invention, by verifying the variations in the water table of the aquifers. However this quantitative monitoring can also be verified by measuring the flow of discharge points (springs) according to the type of the catchment.

It should be noted that this process makes it possible to calculate a theoretical maximum harvestable volume based on a pseudo-static water table and critical use level on a catchment. This theoretical maximum harvestable volume is not necessarily attainable in operating conditions.

Computer Program

It should be noted that a computer program comprising instructions adapted to the implementation of each step of the above described method may be developed. Thus, a computer is capable of executing this computer program to increase efficiency and speed.

System

Furthermore, a system comprising means for implementing each of the above steps can be achieved.

The invention has been illustrated and described in detail in the foregoing description. Said description must be considered as illustrative and given as an example and not as limiting the invention to this description alone. Many variants are possible.

In the claims, the word "comprising" does not exclude other elements and the indefinite article "a" does not exclude a plurality.

The invention claimed is:

1. A method for determining over time a maximum permissible volume of water that can be harvested from a groundwater source, said volume of water being harvested at a harvesting point and a hydrogeological status of the groundwater source is qualified by measurements of water tables on a reference piezometer, said method being characterized in that it comprises the following steps:
   a) continuously measuring of a water table by a first level sensor at the harvesting point, said sensor having a first data record available for a predetermined period in the past;
   b) continuously measuring of the water table by a second level sensor on the reference piezometer, said second sensor having a second data record available for a predetermined period in a past;

said method further comprising the following steps implemented by a computer:

c) processing the data from the first level sensor to create a record of the pseudo-static water tables and a record of dynamic water tables for the predetermined period in the past;

d) determining a record of drawdown at the harvesting point over said predetermined period in the past, a drawdown is defined as a difference, at a given moment, between the pseudo-static and dynamic water tables;

e) determining apparent transmissivity values at the harvesting point, for reproducing a best possible record of determined drawdowns over said predetermined period in the past, using a Cooper-Jacob analytic relationship to associate an apparent transmissivity value with different types of pseudo-static water tables, the association of the apparent transmissivity value with the different types of pseudo-static water tables being a first relationship;

f) determining a critical use level at said harvesting point;

g) selecting a reference piezometer having water table measurements over said predetermined period in the past;

h) calculating averages over time of said pseudo-static water tables and the water tables measured on the reference piezometer over said predetermined period in the past;

i) determining a second relationship between said averages over time of said pseudo-static water tables and the averages over time of said water tables measured on the reference piezometer over said predetermined period;

j) determining a maximum permissible drawdown for each pseudo-static water table value, maximum permissible drawdown being defined as the difference between a pseudo-static water table and said critical use level;

k) determining the maximum permissible harvestable volume of said underground water source at said harvesting point using the Cooper-Jacob relationship and said first and second relationships.

2. The method of claim 1, wherein said averages over time are monthly averages.

3. A non-transitory machine-readable storage medium configured to store a program comprising instructions for implementing each of the steps for determining over time a maximum permissible volume of water that can be harvested from a groundwater source, said volume of water being harvested at a harvesting point and the hydrogeological status of the groundwater source is qualified by measurements of water tables on a reference piezometer:

a) continuously measuring of a water table by a first level sensor at the harvesting point, said sensor having a first data record available for a predetermined period in a past;

b) continuously measuring of the water table by a second level sensor on the reference piezometer, said second sensor having a second data record available for a predetermined period in the past;

c) processing the data from the first level sensor to create a record of the pseudo-static water tables and a record of dynamic water tables for the predetermined period in the past;

d) determining a record of drawdown at the harvesting point over said predetermined period in the past, a drawdown is defined as a difference, at a given moment, between the pseudo-static and dynamic water tables;

e) determining apparent transmissivity values at the harvesting point, for reproducing a best possible record of determined drawdowns over said predetermined period in the past, using a Cooper-Jacob analytic relationship to associate an apparent transmissivity value with different types of pseudo-static water tables, the association of the apparent transmissivity value with the different types of pseudo-static water tables being a first relationship;

f) determining a critical use level at said harvesting point;

g) selecting a reference piezometer having water table measurements over said predetermined period in the past;

h) calculating averages over time of said pseudo-static water tables and the water tables measured on the reference piezometer over said predetermined period in the past;

i) determining a second relationship between said averages over time of said pseudo-static water tables and the averages over time of said water tables measured on the reference piezometer over said predetermined period;

j) determining a maximum permissible drawdown for each pseudo-static water table value, maximum permissible drawdown being defined as the difference between a pseudo-static water table and said critical use level;

k) determining the maximum permissible harvestable volume of said underground water source at said harvesting point using the Cooper-Jacob relationship and said first and second relationships;

wherein said program is executed on a non-transitory computer readable medium.

4. A system comprising means for implementing each of the steps for determining over time a maximum permissible volume of water that can be harvested from a groundwater source, said volume of water being harvested at a harvesting point and the hydrogeological status of the groundwater source is qualified by measurements of water tables on a reference piezometer:

a) continuously measuring of a water table by a first level sensor at the harvesting point, said sensor having a first data record available for a predetermined period in a past;

b) continuously measuring of the water table by a second level sensor on the reference piezometer, said second sensor having a second data record available for a predetermined period in the past;

said method further comprising the following steps implemented by a computer:

c) processing the data from the first level sensor to create a record of the pseudo-static water tables and a record of dynamic water tables for the predetermined period in the past;

d) determining a record of drawdown at the harvesting point over said predetermined period in the past, a drawdown is defined as a difference, at a given moment, between the pseudo-static and dynamic water tables;

e) determining apparent transmissivity values at the harvesting point, for reproducing a best possible record of determined drawdowns over said predetermined period in the past, using a Cooper-Jacob analytic relationship to associate an apparent transmissivity value with different types of pseudo-static water tables, the association of the apparent transmissivity value with the different types of pseudo-static water tables being a first relationship;

f) determining a critical use level at said harvesting point;

g) selecting a reference piezometer having water table measurements over said predetermined period in the past;

h) calculating averages over time of said pseudo-static water tables and the water tables measured on the reference piezometer over said predetermined period in the past;

i) determining a second relationship between said averages over time of said pseudo-static water tables and the averages over time of said water tables measured on the reference piezometer over said predetermined period;

j) determining a maximum permissible drawdown for each pseudo-static water table value, maximum permissible drawdown being defined as the difference between a pseudo-static water table and said critical use level;

k) determining the maximum permissible harvestable volume of said underground water source at said harvesting point using the Cooper-Jacob relationship and said first and second relationships.

* * * * *